United States Patent
Pong et al.

(10) Patent No.: US 9,122,732 B2
(45) Date of Patent: Sep. 1, 2015

(54) DATA COMPARISON SYSTEM

(75) Inventors: Geoffrey Pong, Kuala Lumpur (MY); Anita Hui, Vancouver (CA)

(73) Assignee: Accenture Global Services Limited, Dublin (IE)

( * ) Notice: Subject to any disclaimer, the term of this patent is extended or adjusted under 35 U.S.C. 154(b) by 600 days.

(21) Appl. No.: 12/839,975

(22) Filed: Jul. 20, 2010

(65) Prior Publication Data

US 2011/0035371 A1    Feb. 10, 2011

Related U.S. Application Data

(60) Provisional application No. 61/231,881, filed on Aug. 6, 2009.

(51) Int. Cl.
*G06F 7/00* (2006.01)
*G06F 17/30* (2006.01)

(52) U.S. Cl.
CPC .... *G06F 17/30557* (2013.01); *G06F 17/30371* (2013.01); *G06F 17/303* (2013.01); *G06F 17/30348* (2013.01)

(58) Field of Classification Search
CPC ........... G06F 17/30; G06F 7/02; G06F 7/026; G06F 7/06; G06F 7/20; G06F 17/30985; G06F 19/22; G06F 2207/025; G06F 17/2211; G06F 19/24; G06F 17/30371; G06F 17/303; G06F 17/30348
USPC ............... 707/758, 690, 692, 701, 999.101
See application file for complete search history.

(56) References Cited

U.S. PATENT DOCUMENTS

| | | | |
|---|---|---|---|
| 5,737,594 A * | 4/1998 | Williams | 1/1 |
| 5,822,511 A * | 10/1998 | Kashyap et al. | 714/6.13 |
| 6,856,972 B1 | 2/2005 | Yun et al. | |
| 7,143,076 B2 * | 11/2006 | Weinberg et al. | 1/1 |
| 7,720,759 B2 | 5/2010 | Fine et al. | |
| 7,912,842 B1 * | 3/2011 | Bayliss | 707/749 |
| 2002/0055932 A1 * | 5/2002 | Wheeler et al. | 707/104.1 |

(Continued)

FOREIGN PATENT DOCUMENTS

| | | | |
|---|---|---|---|
| CN | 101123535 A | 2/2008 | |
| GB | 813768 | 5/1959 | |
| WO | WO 02/13049 A1 | 2/2002 | G06F 17/00 |

OTHER PUBLICATIONS

Australian Examiner's First Report from corresponding Australian Patent Application No. 2010203134, dated Jan. 10, 2011, 2pp.

(Continued)

*Primary Examiner* — Mohammed R Uddin
(74) *Attorney, Agent, or Firm* — Brinks Gilson & Lione

(57) ABSTRACT

A data comparison system is described. The system may include a memory, an interface, and a processor. The memory may store a compare data structure containing multiple data item pairs, each pair including a legacy data item of a legacy dataset and a corresponding new data item of a new dataset, and a tolerance associated with each data item pair. The processor may receive the compare data structure and the associated tolerances. The processor may call a compare data subroutine to compare each data item pair in accordance with the associated tolerance if the data items are fields. Otherwise, the processor may recursively call the compare data subroutine for each record the data items until the data item are fields. The processor may then compare data items in accordance with the associated tolerance.

31 Claims, 14 Drawing Sheets

(56) References Cited

U.S. PATENT DOCUMENTS

| | | | |
|---|---|---|---|
| 2002/0065799 A1* | 5/2002 | West et al. | 707/1 |
| 2003/0101119 A1* | 5/2003 | Parsons et al. | 705/36 |
| 2004/0153469 A1* | 8/2004 | Keith-Hill | 707/101 |
| 2004/0153478 A1* | 8/2004 | Igouchkine | 707/200 |
| 2004/0260862 A1* | 12/2004 | Anderson | 711/100 |
| 2005/0034042 A1* | 2/2005 | Davies et al. | 714/736 |
| 2005/0222928 A1 | 10/2005 | Steier et al. | |
| 2005/0240615 A1* | 10/2005 | Barsness et al. | 707/102 |
| 2006/0074982 A1 | 4/2006 | Spodaryk et al. | 707/104.1 |
| 2006/0129520 A1* | 6/2006 | Lang | 707/1 |
| 2006/0178954 A1* | 8/2006 | Thukral et al. | 705/28 |
| 2006/0235899 A1* | 10/2006 | Tucker | 707/200 |
| 2007/0039018 A1* | 2/2007 | Saslow et al. | 725/22 |
| 2007/0097755 A1 | 5/2007 | Marndi et al. | |
| 2008/0005106 A1* | 1/2008 | Schumacher et al. | 707/6 |
| 2008/0016059 A1* | 1/2008 | Henkin et al. | 707/5 |
| 2008/0244008 A1* | 10/2008 | Wilkinson et al. | 709/205 |
| 2008/0313183 A1* | 12/2008 | Cunningham et al. | 707/6 |
| 2009/0106245 A1* | 4/2009 | Salcedo | 707/6 |
| 2009/0171959 A1 | 7/2009 | Xu et al. | 707/7 |
| 2009/0216347 A1* | 8/2009 | Mahfouf et al. | 700/31 |
| 2009/0290245 A1* | 11/2009 | Motoki | 360/15 |
| 2010/0131526 A1* | 5/2010 | Sun et al. | 707/758 |

OTHER PUBLICATIONS

European Search Report, dated Nov. 5, 2010, pp. 1-10, European Patent Application No. 10007747.8-2201, European Patent Office, Germany.

CDB Database Comparator User Guide, Aug. 2004, pp. 1-84, http://www.freewebs.com/willswins/Database.

Chinese First Office Action with English Translation for related Application No. 201010238962.2 dated Mar. 5, 2013 (7 pages).

* cited by examiner

Mass Comparison

810 — Variant
- Object Name: YZ09BST005
- Variant Name: SAMPLE_VAR

820 — Batch
- Creation Batch: ___ to ___
- Change Batch ID: ___ to ___

830 — Select Options
- Select Option 1: ___ to ___
- Select Option 2: ___ to ___
- Select Option 3: ___ to ___
- Select Option 4: ___ to ___
- Select Option 5: ___ to ___

840 — Tolerance
- Tolerance Grouping for Records: 5

850 — Download Files to Server
- Logical file path: YTEST
- File Prefix: 20090325_184832_
- ☐ Record Detail
- ☐ Field Summary
- Field Detail:
  - 860 ☐ Exact Match
  - ☐ Within Tolerance
  - ☐ Outside Tolerance

Mass Comparison

Record Level Reconciliation Report

| Country code | DE |
|---|---|

| % Fields Within a Record | Exact Match | Within Tolerance | Outside Tolerance |
|---|---|---|---|
| 95 - 100 | 100% (4) | 0% (0) | 0% (0) |
| 90 - 95 | 0% (0) | 0% (0) | 0% (0) |
| 85 - 90 | 0% (0) | 0% (0) | 0% (0) |
| 80 - 85 | 0% (0) | 0% (0) | 0% (0) |
| 75 - 80 | 0% (0) | 0% (0) | 0% (0) |
| 70 - 75 | 0% (0) | 0% (0) | 0% (0) |
| 65 - 70 | 0% (0) | 0% (0) | 0% (0) |
| 60 - 65 | 0% (0) | 0% (0) | 0% (0) |
| 55 - 60 | 0% (0) | 0% (0) | 0% (0) |
| 50 - 55 | 0% (0) | 0% (0) | 0% (0) |
| 45 - 50 | 0% (0) | 0% (0) | 0% (0) |
| 40 - 45 | 0% (0) | 0% (0) | 0% (0) |
| 35 - 40 | 0% (0) | 0% (0) | 0% (0) |
| 30 - 35 | 0% (0) | 0% (0) | 0% (0) |
| 25 - 30 | 0% (0) | 0% (0) | 0% (0) |
| 20 - 25 | 0% (0) | 0% (0) | 0% (0) |
| 15 - 20 | 0% (0) | 0% (0) | 0% (0) |
| 10 - 15 | 0% (0) | 0% (0) | 0% (0) |
| 5 - 10 | 0% (0) | 0% (0) | 0% (0) |
| 0 - 5 | 0% (0) | 100% (4) | 100% (4) |

| Field Level Reconciliation Report | | | | | |
|---|---|---|---|---|---|
| Node ID | Field Name | Field Description | Exact Match | Within Tolerance | Outside Tolerance | Country |
| 000004 | ID | Customer Number | 100% (1) | 0% (0) | 0% (0) | CH |
| 000004 | ID | Customer Number | 100% (4) | 0% (0) | 0% (0) | DE |
| 000004 | ID | Customer Number | 100% (5) | 0% (0) | 0% (0) | GB |
| 000007 | STREET | STREET | 100% (1) | 0% (0) | 0% (0) | CH |
| 000007 | STREET | STREET | 100% (4) | 0% (0) | 0% (0) | DE |
| 000007 | STREET | STREET | 100% (5) | 0% (0) | 0% (0) | GB |
| 000010 | CITY | CITY | 100% (1) | 0% (0) | 0% (0) | CH |
| 000010 | CITY | CITY | 100% (4) | 0% (0) | 0% (0) | DE |
| 000010 | CITY | CITY | 100% (5) | 0% (0) | 0% (0) | GB |

Field Level Outside Tolerance

| | |
|---|---|
| Node ID | 000011 |
| Fieldname | COUNTRY |
| Description | Country code |
| Exact Match | 0% (0) |
| Within Tolerance | 0% (0) |
| Outside Tolerance | 100% (1) |
| Tolerance | 0 |

| Stat No | Old Value | Non Value | Difference | Amount | Country | cLangua | eCustomer Num | eCustomer Name |
|---|---|---|---|---|---|---|---|---|
| 020000000000012 | 68 | 18 | 0 | 0.000000000000000 | 10 | EN | 00000001 | Martin |

| | |
|---|---|
| Node ID | 000014 |
| Fieldname | CUSTTYPE |
| Description | Customer type |
| Exact Match | 75% (3) |
| Within Tolerance | 0% (0) |
| Outside Tolerance | 25% (1) |
| Tolerance | 0 |

| Stat No | Old Value | New Value | Difference | Amount | Country | cLangua | eCustomer Num | eCustomer name |
|---|---|---|---|---|---|---|---|---|
| 020000000000009 | P | 1 | 0 | 0.000000000000000 | DE | DE | 00000000 | Andreas Lotz |

DATA COMPARISON SYSTEM

CROSS-REFERENCE TO RELATED APPLICATIONS

This application claims the benefit of U.S. Provisional Application No. 61/231,881, filed on Aug. 6, 2009, which is incorporated by reference herein.

TECHNICAL FIELD

The present description relates generally to a system, method, and tool, generally referred to as a system, to provide data comparison, and more particularly, but not exclusively, a reusable system for validating data produced by a new system with data produced by a legacy system.

BACKGROUND

Legacy computer systems are continuously being replaced with newer, more effective computer systems in order to reduce costs and increase efficiency. After each new system is implemented, the data produced by the new system must be compared against the data produced by the legacy system. Any discrepancies between the two systems should be rectified before the new system can be put online and before the legacy system can be taken offline. Often the comparison of the data produced by the two systems may be performed manually. The data may be loaded into a spreadsheet and the values in the spreadsheet may be manually compared. Due to data volumes and resource limitations, only a subset of data is selected for comparison using this method. A manual comparison may require a significant amount of man-hours and may suffer from human error and, consequently, may result in deployment risk. Since legacy systems are often customized for a particular implementation, automated data comparison systems may not exist, or may not be capable of effectively comparing the data produced by the two systems.

SUMMARY

A data comparison system may include a memory, an interface, and a processor. The memory may be connected to the processor and the interface and may store a compare data structure storing data item pairs. Each data item pair may include a legacy data item of a legacy dataset and a corresponding new data item of a new dataset. The data item pairs may have a data type of a field data type, a table data type, a flat structure data type or a deep structure data type. The table data type, the deep structure data type and the flat structure data type may each include one or more records. The memory may also store a tolerance associated with each of the data item pairs. The interface may be operatively connected to the memory and may be operative to communicate with a device of a user. The processor may receive, from the device of the user via the interface, the compare data structure and the associated tolerances. The processor may call a compare data subroutine to compare each legacy data item and each new data item of each data item pair, in accordance with each associated tolerance, if the data type of each data item pair is the field data type. Otherwise, the processor may recursively call the compare data subroutine for each record of each data item pair until the data type of each data item pair is the field data type. Then the processor may compare the legacy data item and the compare data item of the data item pair in accordance with the associated tolerance.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 8 is a screenshot of a user interface for configuring the data comparison system of FIG. 1, or other data comparison systems.

FIG. 9 is a screenshot of a record level report in the system of FIG. 1, or other data comparison systems.

FIG. 10 is a screenshot of a field level report in the system of FIG. 1, or other data comparison systems.

FIG. 11 is a screenshot of a field level outside tolerance report in the system of FIG. 1, or other data comparison systems.

DETAILED DESCRIPTION

A system, method and tool, generally referred to as a system, may relate to providing a data comparison system, and more particularly, but not exclusively, a reusable system for validating data produced by a new system with data produced by a legacy system. The principles described herein may be embodied in many different forms.

The data comparison system can be used to validate the data produced by two systems, such as a legacy system and a legacy replacement system. The reconfigurability of the system allows an organization, such as an organization providing consulting services, to reuse the system across multiple clients and multiple data validations within each client. The system allows a user to configure the tolerance level for a comparison, at both the field and record levels, thereby allowing the tolerance levels to be tailored to each individual implementation. The system provides an efficient way of comparing complex data structures by using recursive subroutine calls to compare the complex data structures. The system generates reports containing field-level and record-level statistics which provide users with a clear and concise summary of the data comparison.

Figure 1:
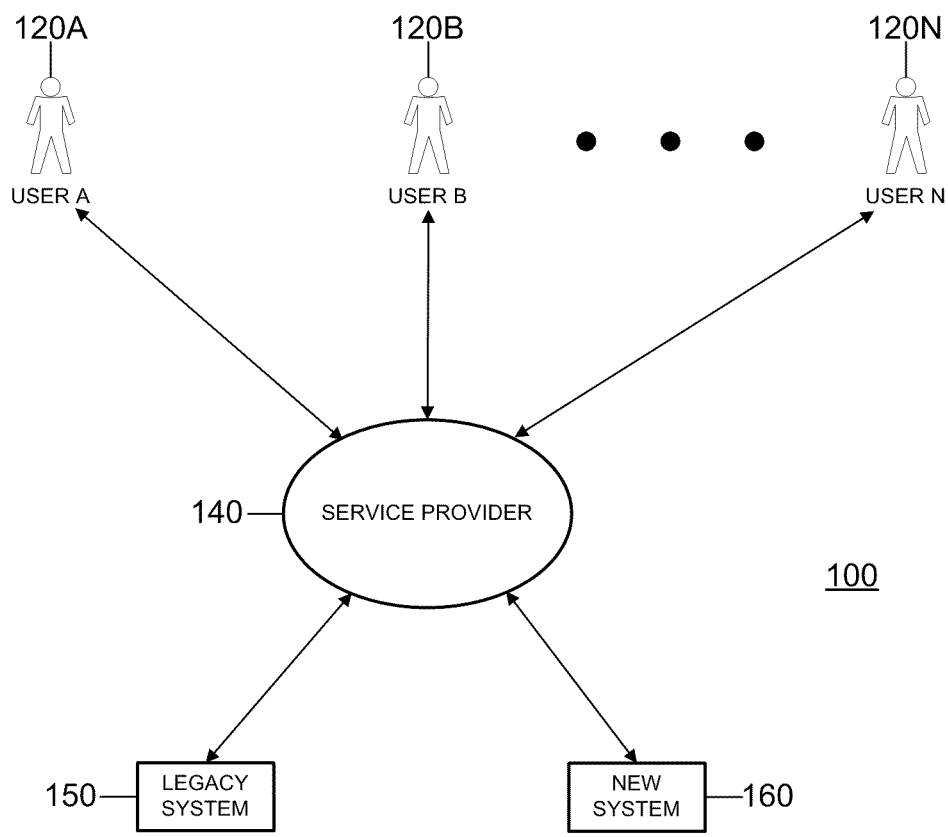
FIG. 1 is a block diagram of a general overview of a data comparison system.

FIG. 1 provides a general overview of a data comparison system 100. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more users 120A-N, a service provider 140, a legacy system 150, and a new system 160. The users 120A-N may be administrators, consultants, or other persons capable of configuring the system 100 to compare the data produced by the new system 160 with the data produced by the legacy system 150. The legacy system 150 may be an existing system used by an organization, such as a billing system. The new system 160 may be a system implemented to replace the legacy system 150. The modifiers "legacy" and "new" may be used for the purpose of differentiating the systems 150, 160. The modifiers "first" and "second" may also be used to differentiate the systems 150, 160. In one example, the new system 160 may be an Industry Specific Solution for Utilities Industry (IS-U) provided by SAP AG®. The legacy system 150 may be any system previously used by the organization to perform at least a subset of the functions performed by the new system 160. Alternatively or in addition, the legacy system 150 may be any system previously used by the organization to access data which is also accessed by the new system 160.

The service provider 140 may provide the users 120A-N with a data comparison system, such as through a network accessible application. The data comparison system 100 may allow the users 120A-N to effectively compare data produced by a legacy system 150 with data produced by a new system 160. The data comparison system 100 may include two modules, a variant creation module, and a data comparison module. The variant creation module of the data comparison system 100 may be used to configure options related to the compare operation, such as the tolerance levels for each field and/or record, the fields and/or records to be included in the compare operation, the reporting preferences for the compare operation, and any additional options related to the compare operation. The tolerance levels may identify how closely the data from the new system 160 should match the data from the legacy system 150 to be within tolerance. The variant creation module may output a variant data structure storing the options selected in the variant creation module. The variant creation module is discussed in more detail in FIGS. 6-8 below. The data comparison module of the data comparison system 100 may compare the data produced by the two systems and output record level and field level comparison statistics. The statistics may be grouped according to the preferences identified in the variant data structure.

In operation, a user A 120A may identify a mapping between each field in the new system 160 and each field in the legacy system 150. The mappings between the systems 150, 160 may be stored in a compare data structure. The compare data structure may be a flat data structure, a tree data structure, or a complex tree data structure. Once the mappings between the systems 150, 160 are identified, the system 100 may load pairs of data items from each of the systems 150, 160 into the compare data structure in accordance with the identified mappings. The pairs of data items loaded from the systems 150, 160 may be fields, tables, flat data structures, deep data structures, or complex data structures. The compare data structure may then be inputted into the variant module to identify the options for the compare operation, such as the fields to be compared and the tolerance for each field being compared.

For example, a flat data structure may be a data structure that only contains elementary data types of fixed length (no internal tables, reference types, or strings). A reference type may refer to a data type that describes reference variables, that is, data objects that contain references. An internal table may consist of a series of lines that all have the same data type. A flat data structure may be a nested data structure, i.e. a data structure that contains one or more other structures as components, so long as none of the specified types are contained in any nesting level. A deep data structure may be any structure that contains at least one deep component at any nesting level, such as strings, internal tables, boxed components, or data or object references. In the case of flat structures, the data content of the structure may be within the memory of the structure itself, while deep structures may contain pointers to the data at the position of the deepest components. Since the field contents are not stored with the field descriptions in the case of deep structures, assignments, offset and length specifications and other operations may be handled differently from flat structures. Complex data structures may be structures with structures as components (nested structures, flat or deep), structures containing internal tables as components (deep structures), or structures consisting of a series of elementary data types of fixed length (non-nested, flat structures).

Once the user A 120A has configured the compare operation using the variant module, the variant data structure outputted by the variant module, and the compare data structure, may be inputted into the comparison module to compare the data produced by the systems 150, 160. The comparison module may utilize a comparison subroutine to compare the data items from each system 150, 160 stored in the compare data structure. If the data items are fields, the comparison subroutine may compare the data items and determine whether the data items are an exact match, within the identified tolerance or outside of the identified tolerance. The steps of determining whether two data items are within the identified tolerances of each other are discussed in more detail in FIG. 5 below. If the data items are tables, flat data structures, or complex data structures, the comparison subroutine may be recursively called on each record in the table, flat data structure or complex data structure. The subroutine may continue to be recursively called until the data items being compared are fields, at which point the subroutine will compare the data items. The steps of recursively calling the compare subroutine are discussed in more detail in FIG. 4 below.

After the compare subroutine has recursively cycled through all of the data items stored in the compare data structure, the data comparison module may generate a report containing field level and record level statistics of the comparison. The report may indicate how closely the data produced by the new system 160 matches the data produced by the legacy system 150. The service provider 140 may then provide the report to the user A 120A. Exemplary reports are discussed in more detail in FIGS. 9-13 below.

Figure 2:
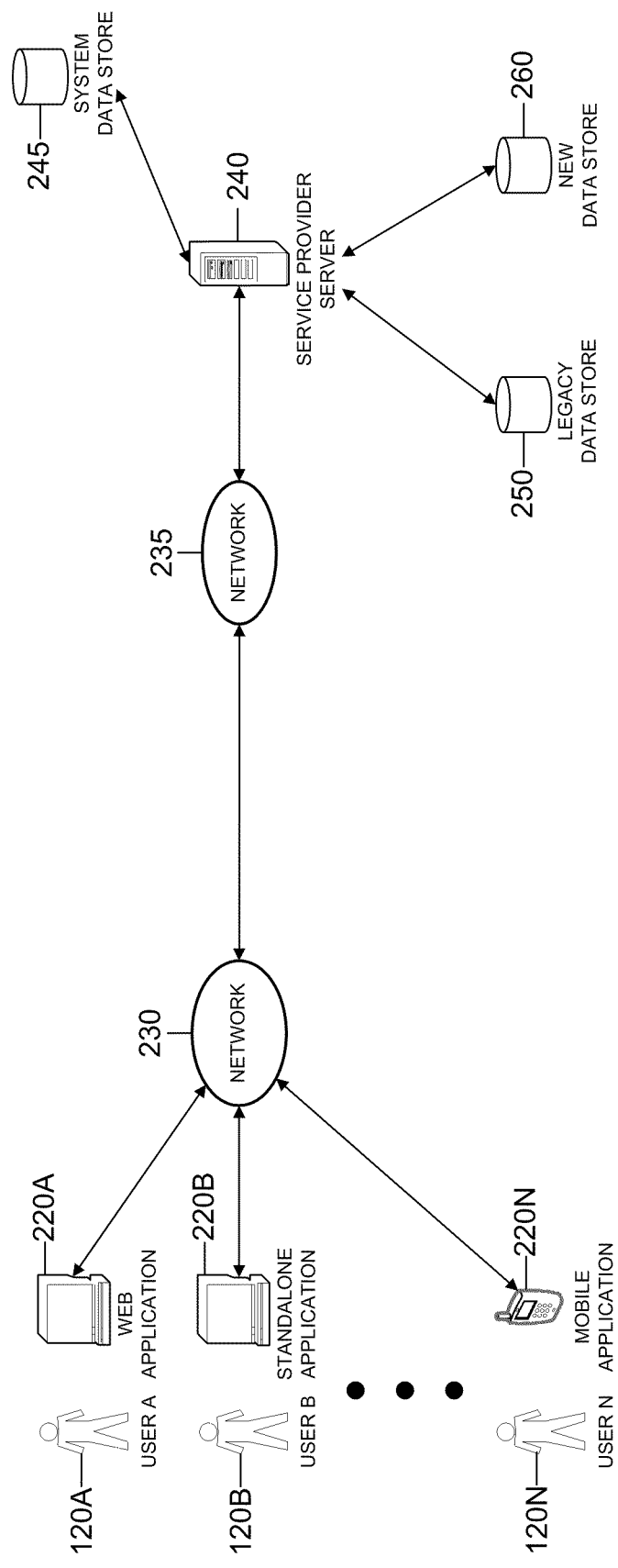
FIG. 2 is a block diagram of a network environment implementing the system of FIG. 1 or other data comparison systems.

FIG. 2 provides a simplified view of a network environment 200 implementing the system of FIG. 1 or other data comparison systems. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more users 120A-N, a service provider server 240, a service provider data store 245, a legacy system data store 250, a new system data store 260, networks 230, 235, and one or more web applications, standalone applications, mobile applications 220A-N, which may collectively be referred to as client applications. Some or all of the service provider server 240 and the third party server 250 may be in communication with each other by way of network 235.

The networks 230, 235 may include wide area networks (WAN), such as the Internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The web applications, standalone applications and mobile applications 220A-N may be connected to the network 230 in any configuration that supports data transfer. This may include a data connection to the network 230 that may be wired or wireless. Any of the web applications, standalone applications and mobile applications 220A-N may individually be referred to as a client application. The web application 220A may run on any platform that supports web content, such as a web browser or a computer, a mobile phone, personal digital assistant (PDA), pager, network-enabled television, digital video recorder, such as TIVO®, automobile and/or any appliance or platform capable of data communications.

The standalone application 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the networks 230, 235 with the service provider server 240. The standalone application 220B may be programmed in any programming language that supports communication protocols. These languages may include: SAP® ADVANCED BUSINESS APPLICATION PROGRAMMING (ABAP), SUN JAVA®, C++, C#, ASP, SUN JAVASCRIPT®, asynchronous SUN JAVASCRIPT®, or ADOBE FLASH ACTIONSCRIPT®, ADOBE FLEX®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data. For example, the mobile application 220N may be an application running on an APPLE IPHONE®.

The service provider server 240 may include one or more of the following: an application server, a mobile application server, a data store, a database server, and a middleware server. The service provider server 240 may exist on one machine or may be running in a distributed configuration on one or more machines.

Figure 14:
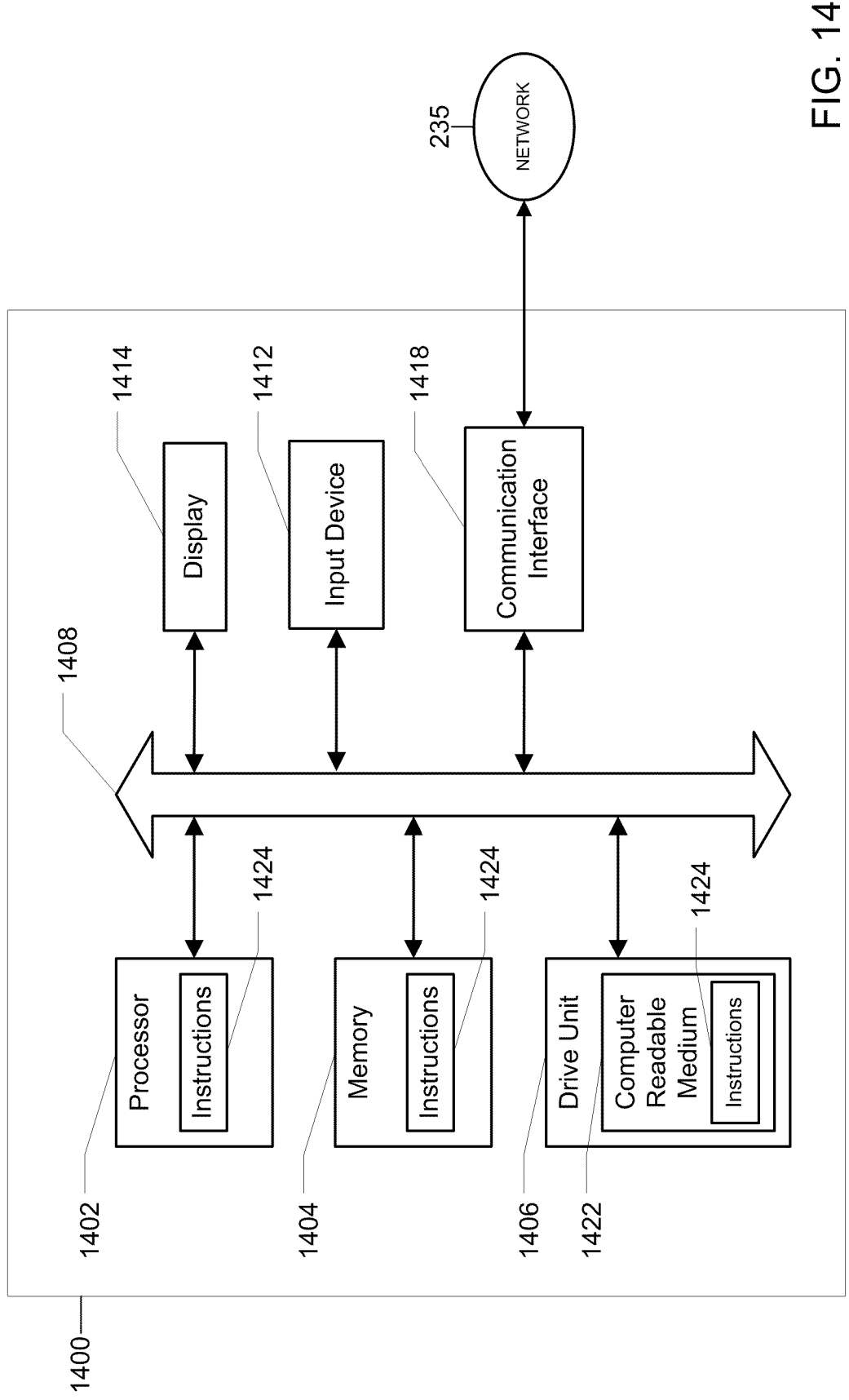
FIG. 14 is an illustration of a general computer system that may be used in the systems of FIG. 1, FIG. 2, or other data comparison systems.

The service provider server 240 and client applications 220A-N may be one or more computing devices of various kinds, such as the computing device in FIG. 14. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 220A may employ the Hypertext Transfer Protocol ("HTTP") to request information, such as a web page, from a web server, which may be a process executing on the service provider server 240.

There may be several configurations of database servers, application servers, mobile application servers, and middleware applications included in the service provider server 240. The service provider data store 245 may be part of the service provider server 240 and may be a database server, such as MICROSOFT SQL SERVER®, ORACLE®, IBM DB2®, SQLITE®, or any other database software, relational or otherwise. The application server may be SAP NETWEAVER APPLICATION SERVER®, SAP WEB APPLICATION SERVER®, APACHE TOMCAT®, MICROSOFT IIS®, ADOBE COLDFUSION®, or any other application server that supports communication protocols. The legacy system data store 250 and the new system data store 260 may be a database server, such as MICROSOFT SQL SERVER®, ORACLE®, IBM DB2®, SQLITE®, or any other database software, relational or otherwise.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
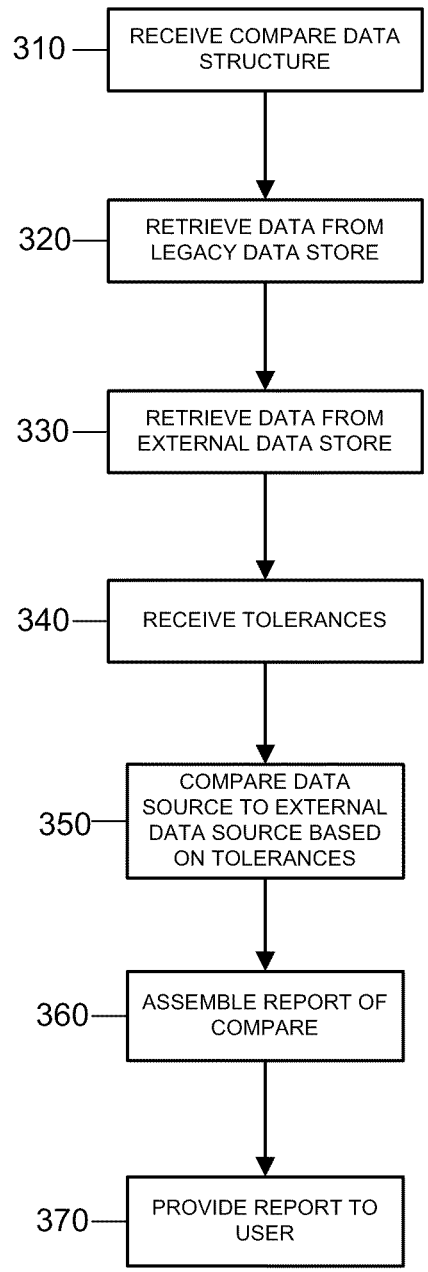
FIG. 3 is a flowchart illustrating the steps of providing a comparison report in the system of FIG. 1 or other data comparison systems.

FIG. 3 is a flowchart illustrating the steps of providing a comparison report in the system of FIG. 1 or other data comparison systems. The steps of FIG. 3 are described as being performed by the service provider server 240. However, the steps may be performed by the processor of the service provider server 240, or by any other hardware component of the service provider server 240. Alternatively the steps may be performed by an external hardware component.

At step 310, the service provider server 240 may receive a compare data structure. The compare data structure may include the mappings between the fields in the legacy data store 250 and the fields in the new data store 260. Each mapping, or data item pair, may include a field from the legacy data store 250 and the corresponding field from the new data store 260. The compare data structure may be an extensible markup language (XML) document. The compare data structure may be created by a user A 120A, such as by using an XML document editor. The service provider server 240 may store the compare data structure in the service provider data store 245.

At step 320, the service provider server 240 may retrieve the data items from the legacy data store 250 to be compared. The service provider server 240 may store the data items from the legacy data store 250 in the compare data structure. At step 330, the service provider server 240 may retrieve the data items from the new data store 260 to be compared. The service provider server 240 may store the data items from the new data store 260 in the compare data structure. At step 340, the service provider server 240 may receive the tolerances for each of the mappings, such as from a networked device of the user A 120A. For example, the user A 120A may access the variant module to identify the tolerance levels for each of the data item pairs. The variant module may output a variant data structure storing the tolerances, which may be provided to the service provider server 240.

The tolerances may indicate an acceptable level of variance between a data item in the legacy data store 250, and the new data store 260, when the data items are not an exact match. The tolerances may differ for each data type. For example, for dates, the tolerances may indicate an acceptable number of days difference between two dates. For numbers, a tolerance may indicate an acceptable percentage difference between two numbers, and/or an acceptable absolute difference between two numbers. For characters, a tolerance may indicate whether the compare should be case sensitive and/or ignore spaces. For tables, the tolerance may indicate an acceptable number of records difference between two tables.

At step 350, the service provider server 240 may compare the data produced by the legacy system 150 and the data produced by the new system 160. The service provider server 240 may use the tolerances received in step 340 to determine whether each data item is an exact match, is within the tolerance, or is not within the tolerance. The service provider server 240 may call a compare subroutine to compare each data item pair in the compare data structure. The compare subroutine will perform the comparison if the data items are fields. However, if the data items are tables, flat structures, or deep structures, the compare subroutine may be recursively called for each record in the table, flat structure, or deep structure. The compare subroutine may continue to be recursively called until the data items are fields. The steps of compare subroutine are discussed in more detail in FIG. 4 below.

At step 360, the service provider server 240 may assemble a report for the comparison. The report may include field level and record level statistics indicating whether each field and/or record was an exact match, whether each field and/or record was within the identified tolerance, or whether each field and/or record was outside of the identified tolerance. Exemplary reports are shown and discussed in FIGS. 9-13 below. At step 370, the service provider server 240 provides the report to the user A 120A, such as via a networked device of the user A 120A. The user A 120A may view the report to determine whether the new system 160 is producing accurate data.

Figure 4:
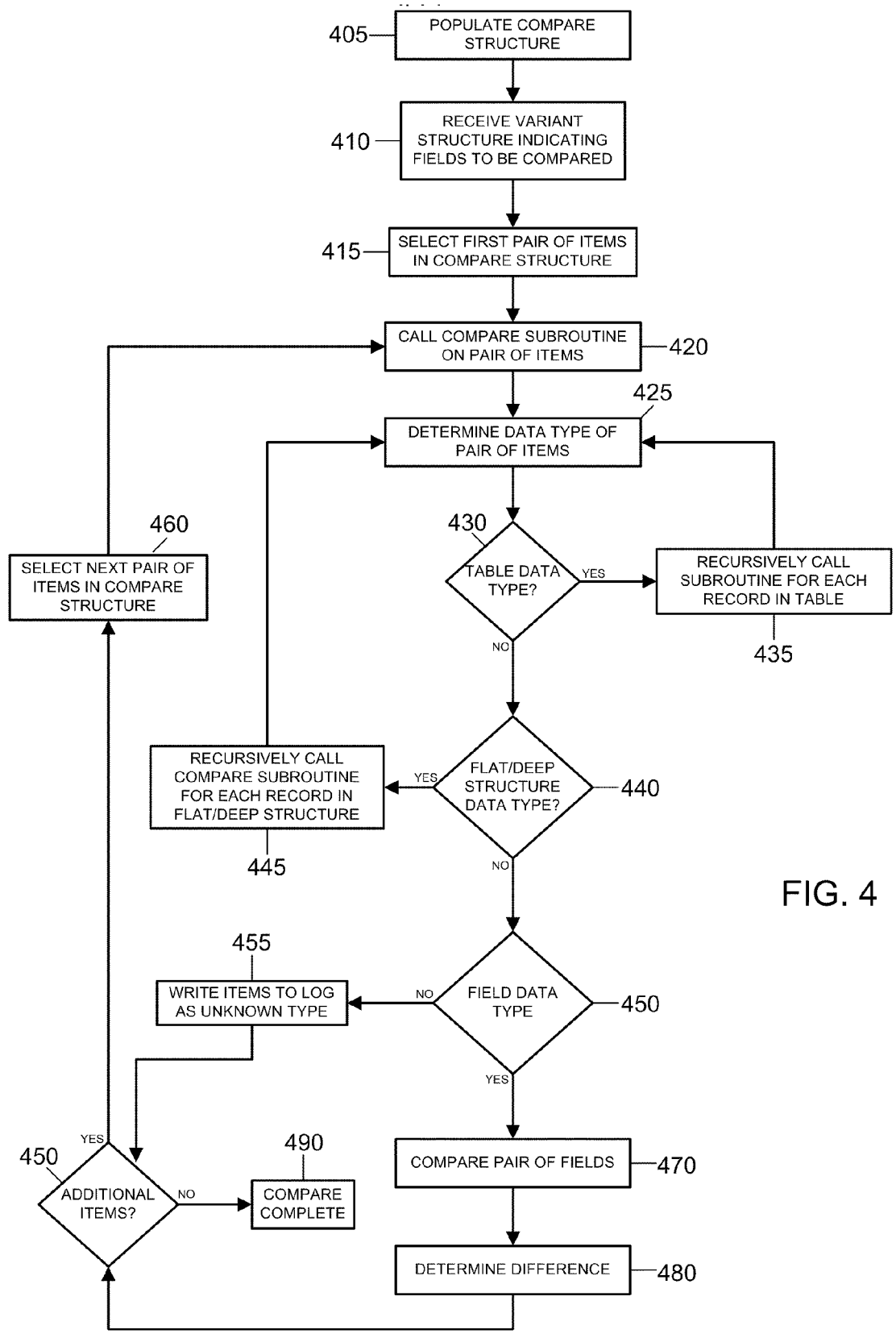
FIG. 4 is a flowchart illustrating the steps of comparing a legacy dataset and a new dataset in the system of FIG. 1, or other data comparison systems.

FIG. 4 is a flowchart illustrating the steps of comparing a legacy dataset and a new dataset in the system of FIG. 1, or other data comparison systems. The steps of FIG. 4 are described as being performed by the service provider server 240. However, the steps may be performed by the processor of the service provider server 240, or by any other hardware component of the service provider server 240. Alternatively the steps may be performed by an external hardware component.

At step 405, the service provider server 240 populates the compare data structure with data items from the legacy data store 250 and data items from the new data store 260. At step 410, the service provider server 240 receives the variant data structure storing an indication of which fields from the legacy data store 250 and the new data store 260 should be compared, and the tolerance levels for each of the fields to be compared. For example, the user A 120A may use the variant module to create the variant data structure. At step 415, the service provider server 240 may select the first pair of data items from the compare data structure which are to be compared. The data item pairs stored in the compare data structure may be different data types, such as field data types, table data types, flat structure data types or deep structure data types. The data item pairs which are the table data type, the flat structure data type, or the deep structure data type may each include one or more records. Each record may also include fields, tables, flat structures or deep structures.

At step 420, the service provider server 240 may call the compare subroutine on the selected pair of data items. At step 425, the service provider server 240 may determine, through the compare subroutine, the data type of the pair of data items. At step 430, the service provider server 240 determines whether the data items are the table data type. If, at step 430, the service provider server 240 determines that the data items are the table data type, the service provider server 240 moves to step 435. At step 435, the service provider server 240 recursively calls the compare subroutine for each record in each table of each data item. Thus, the each record of the legacy data item, and each corresponding record of the new data item, forms a data item pair which is recursively inputted to the compare subroutine. The service provider server 240 returns to step 425 for each data item pair formed by the records of the legacy data item table and the new data item table.

If, at step 430, the service provider server 240 determines that the data items are not the table data type, the service provider server 240 moves to step 440. At step 440, the service provider server 240 determines whether the data items are the flat structure data type or the deep structure data type. If, at step 440, the service provider server 240 determines that the data items are the flat structure data type or the deep structure data type, the service provider server 240 moves to step 445. At step 445, the service provider server 240 recursively calls the compare subroutine on each of the records in the flat structure or the deep structure. Thus, each record of the legacy data item flat or deep structure and each corresponding record of the new data item flat or deep structure forms a data item pair which is recursively inputted to the compare subroutine. The service provider server 240 then returns to step 425 for each data item pair formed by the records of the legacy data item flat or deep structure and the new data item flat or deep structure.

If, at step 440, the service provider server 240 determines that the data items are not the flat structure data type or the deep structure data type, the service provider server 240 moves to step 450. At step 450, the service provider server 240 determines whether the data items are the field data type. If, at step 450, the service provider server 240 determines that the data items are not the field data type, then the service provider server 240 moves to step 455. At step 455, the service provider server 240 writes the items to a log, such as an error log, indicating that the items are an unknown data type. The service provider server 240 then moves to step 460. At step 460, the service provider server 240 determines whether there are additional items in the compare data structure. If, at step 460, the service provider server 240 determines there are additional items in the compare data structure, then the service provider server 240 moves to step 465. At step 465, the service provider server 240 retrieves the next pair of data items in the compare data structure and returns to step 420.

It, at step 450, the service provider server 240 determines that the items are the field data type, the service provider server 240 moves to step 470. At step 470, the service provider server 240 compares the two fields. At step 480, the service provider server 240 may determine any difference between the items. The service provider server 240 may also determine whether any difference between the items is within the tolerance identified for the items. The service provider server 240 may then store the difference and whether the difference is within the tolerance, such as in the service provider data store 245. The steps of determining whether any difference is within the tolerance are discussed in more detail in FIG. 5 below. The service provider server 240 may then move to step 450 and determine whether there are any additional items in to be compared in the compare data structure.

If, at step 450, the service provider server 240 determines there are no additional items to be compared in the compare data store, the service provider server 240 moves to step 490. At step 490, the comparison between the legacy data store 250 and the new data store 260 is complete. The service provider server 240 may generate a report with field and record level statistics and may provide the report to the user A 120A, such as through a networked device of the user A 120A.

Figure 5:
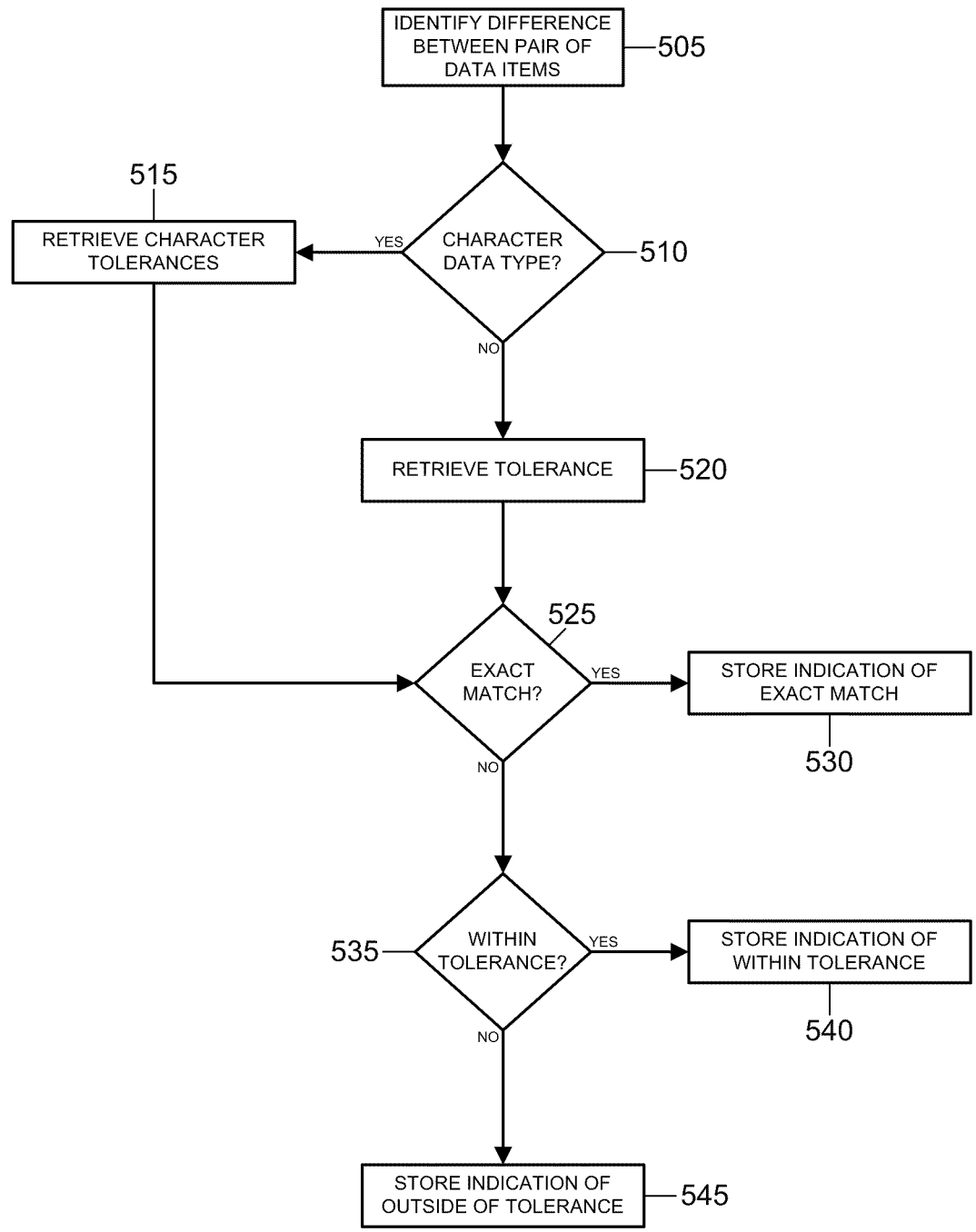
FIG. 5 is a flowchart illustrating the steps of determining whether a comparison is within a tolerance in the system of FIG. 1, or other data comparison systems.

FIG. 5 is a flowchart illustrating the steps of determining whether a comparison is within a tolerance in the system of FIG. 1, or other data comparison systems. The steps of FIG. 5 are described as being performed by the service provider server 240. However, the steps may be performed by the processor of the service provider server 240, or by any other hardware component of the service provider server 240. Alternatively the steps may be performed by an external hardware component.

At step 505, the service provider server 240 may identify any difference between a pair of data items. For example, the service provider server 240 may compare a pair of data items and determine any difference between the data items. At step 510, the service provider server 240 determines whether the compared data items are character data types. If, at step 510, the service provider server 240 determines that the compared data items are character types, the service provider server 240 moves to step 515. At step 515, the service provider server 240 retrieves the character tolerances associated with the data item pair. The character tolerances may be specific to alphanumeric characters and/or phrases, such as matching case, ignoring spaces, or generally any tolerance which may relate to alphanumeric characters and/or phrases.

If, at step 510, the service provider server 240 determines that the data items are not the character data type, the service provider server 240 moves to step 520. At step 520, the service provider server 240 retrieves the tolerance associated with the data item pair. As mentioned above, the tolerance for a date field may be a number of days difference, the tolerance for a numeric field may be an absolute difference between the fields or a percentage difference between the fields, and the tolerance for tables may be a number of records difference between the tables.

At step 525, the service provider server 240 determines whether the data items are an exact match. If, at step 525, the service provider server 240 determines that the data items are an exact match, the service provider server 240 moves to step 530. At step 530, the service provider server 240 stores an indication that the data items are an exact match. If, at step 525, the service provider server 240 determines that the data items are not an exact match, the service provider server 240 moves to step 535. At step 535, the service provider server 240 determines whether the difference between the data items is within the retrieved tolerance. If, at step 535, the service provider server 240 determines that the data items are within the retrieved tolerance, the service provider server 240 moves to step 540. At step 540, the service provider server 240 stores an indication that the data items are within the tolerance.

If, at step 535, the service provider server 240 determines that the data items are not within the tolerance, the service provider server 240 moves to step 545. At step 545, the service provider server 240 stores an indication that the items are outside of the tolerance.

Figure 6:
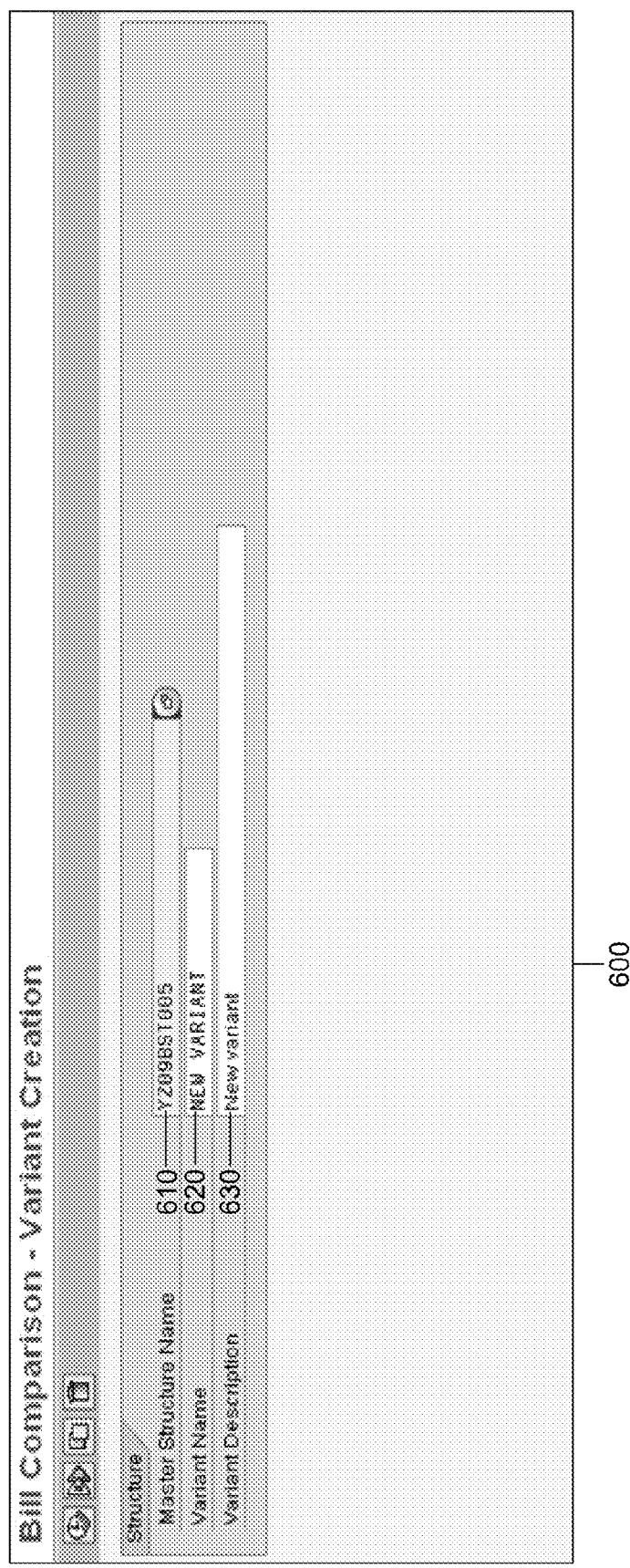
FIG. 6 is a screenshot of a user interface for creating a compare data structure in the system of FIG. 1, or other data comparison systems.

FIG. 6 is a screenshot of a user interface 600 for creating a compare data structure in the system of FIG. 1, or other data comparison systems. The user interface 600 may include a compare data structure name field 610, a variant name field 620, and a variant description field 630. The user A 120A may use the user interface 600 to create a new compare data structure to store the data from the legacy system 150 and the new system 160 being compared. The user A 120A may input the name of the compare data structure in the data structure name field 610. The user A 120A may input the name of the variant data structure in the variant name field 620, and the user A 120A may input a description of the variant data structure in the variant description field 630.

Figure 7:
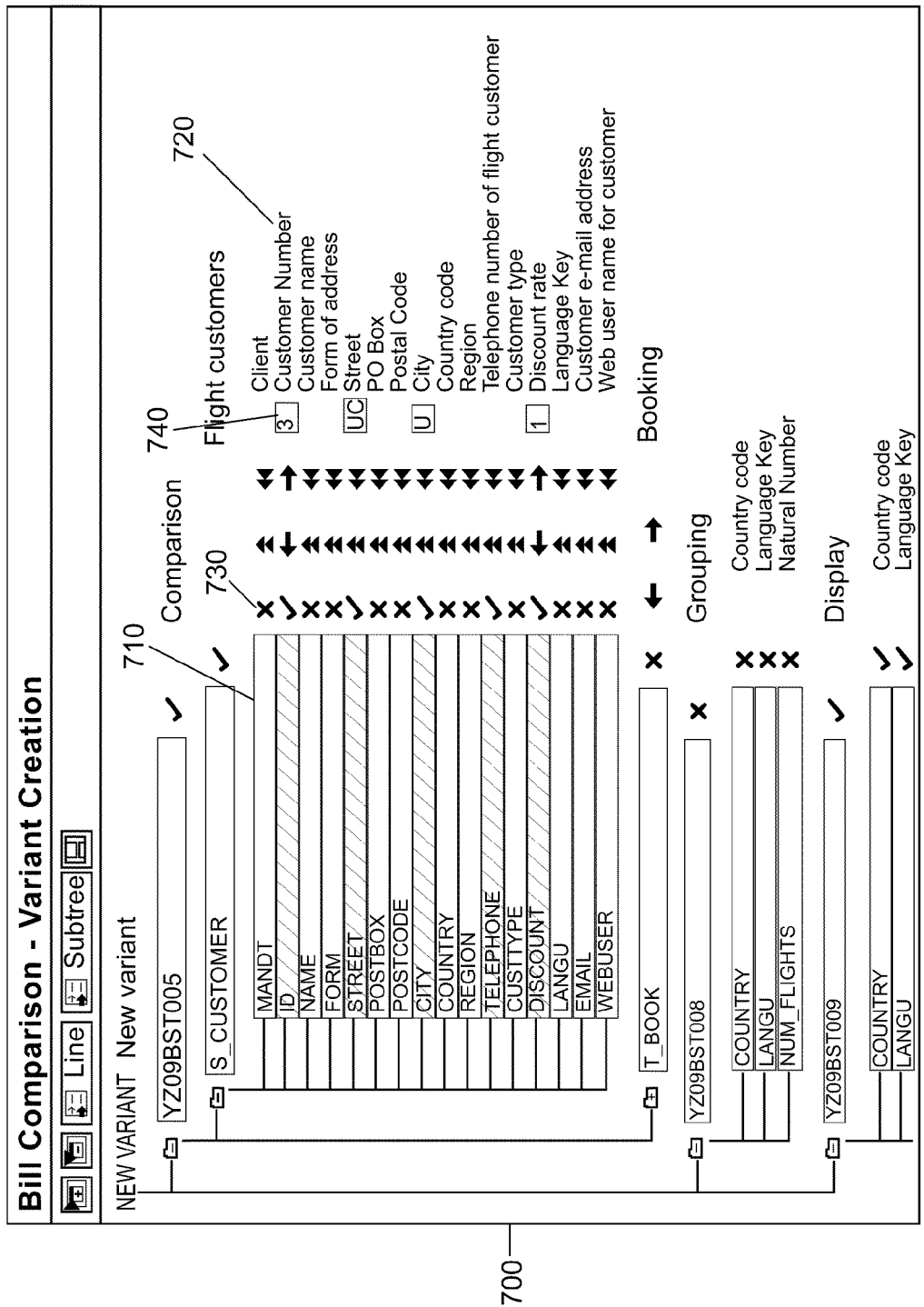
FIG. 7 is a screenshot of a user interface for identifying tolerances for data item pairs unit in the system of FIG. 1, or other data comparison systems.

FIG. 7 is a screenshot of a user interface 700 for identifying tolerances for data item pairs unit in the system of FIG. 1, or other data comparison systems. The user interface 700 may include legacy data items 710, legacy data item descriptions 720, compare selectors 730, and tolerance identifiers 740. The user A 120A may use the user interface 700 to toggle the data items 710 which are compared. For example, in the user interface 700, the fields having a check mark will be included in the comparison operation, and the fields having an 'x' will be excluded from the comparison operation. The user A 120A may view the tolerance identifiers 740 associated with each pair of data items. The tolerance identifiers 740 may identify the tolerances associated with each pair of data items.

FIG. 8 is a screenshot of a user interface 800 for configuring the data comparison system of FIG. 1, or other data comparison systems. The user interface 800 may include a variant section 810, a batch section 820, an options section 830, a tolerance section 840, a download section 850, and a field section 860. The variant section 810 may display the name of the variant data structure used for the comparison. The user A 120A may use the batch section 820 to configure batch options for the comparison. The user A 120A may configure additional options for the comparison in the option section 830. The tolerance grouping may be adjusted in the tolerance section 840. The download section 850 may be used to identify a server to download report files to. The field section 860 may allow a user A 120A to identify which categories of the pair of data items to include in the reports, such as the data items which are exact matches, the data items which are within the tolerance, and/or the data items which are outside of the tolerance.

FIG. 9 is a screenshot of a record level report 900 in the system of FIG. 1, or other data comparison systems. The record level report 900 may display the percentage of fields within each record which were an exact match, the percentage which were within the tolerance, and the percentage which were outside of the tolerance. For the record level report 900, in 100% of the records 95-100% of the fields were an exact match, in 100% of the records 0-5% of the fields were within tolerance and in 100% of the records 0-5% of the fields were outside of tolerance. For example, in 96% of the fields may be an exact match, 2% of the fields may be within tolerance, and 2% of the fields may be outside of tolerance.

FIG. 10 is a screenshot of a field level report 1000 in the system of FIG. 1, or other data comparison systems. The field level report 100 displays the percentages of each field which were an exact match, the percentages of each field which were within tolerance, and the percentages of each field which were outside of the tolerance. In the field level report 1000, the fields may be grouped based on the country associated with each field.

FIG. 11 is a screenshot of a field level outside tolerance report 1100 in the system of FIG. 1, or other data comparison systems. The outside tolerance report 1100 may display the fields which were outside of the identified tolerance. The user A 120A may use the outside tolerance report 1100 to reconfigure the new system 160 such that all the data produced by the new system 160 is within the tolerances. In the outside tolerance report 1100, a country field in the legacy data store 250 has a value of "GB," while the corresponding field in the new data store 260 has a value of "1B." Since the fields are characters and do not match, the fields are outside of the tolerance. In addition, the customer type field in the legacy data store 250 has a value of "P" while the customer type field in the new data store 260 has a value of '1.' Since the values are characters and are not an exact match, the fields are not within the tolerance.

Figure 12:
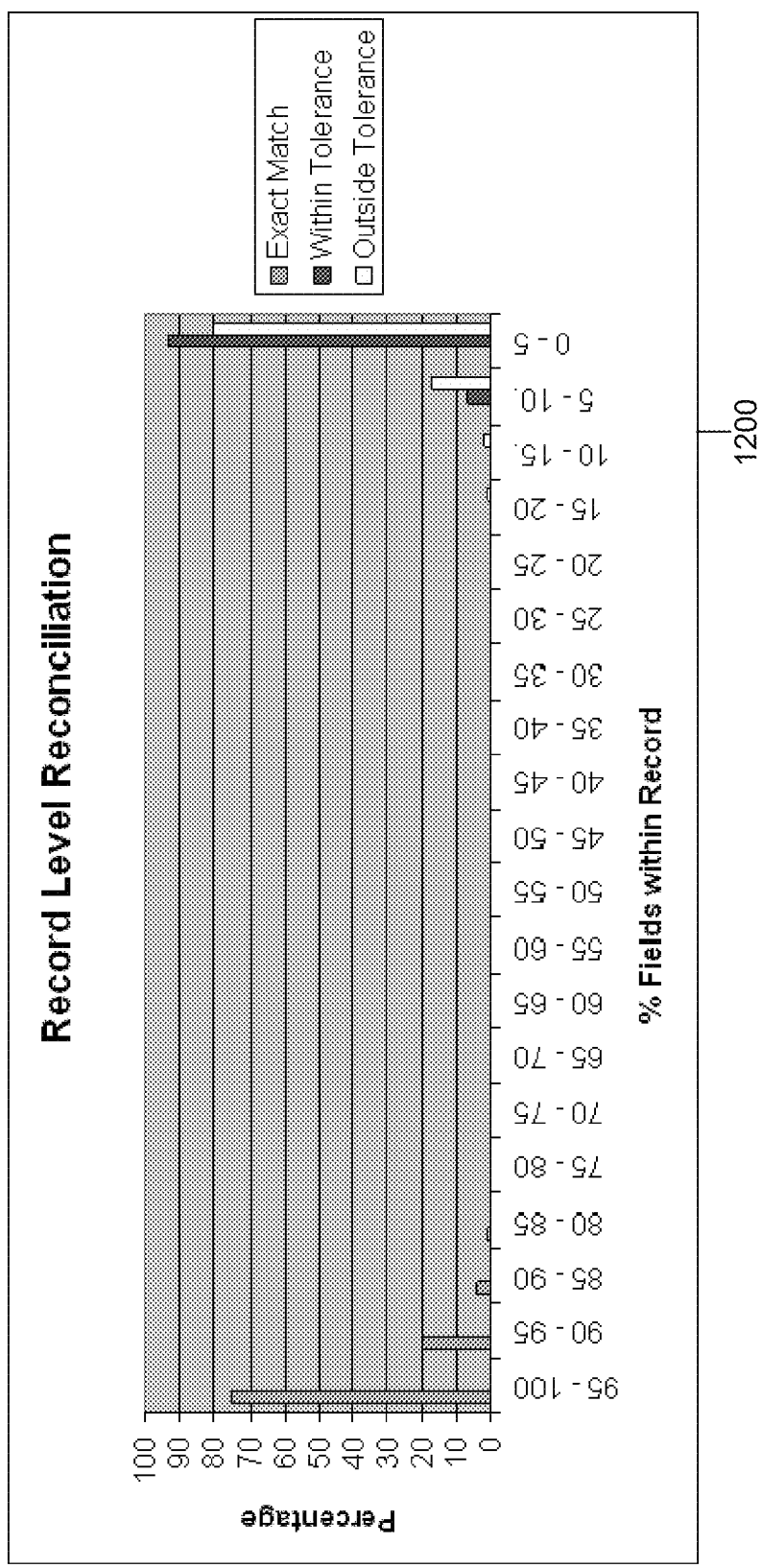
FIG. 12 is a screenshot of a record level graph in the system of FIG. 1, or other data comparison systems.

FIG. 12 is a screenshot of a record level graph 1200 in the system of FIG. 1, or other data comparison systems. The record level graph 1200 provides a graphical representation of the percentage of fields within each record which are an exact match, the percentage of fields within each record which are within tolerance, and the percentage of fields within each record which are outside tolerance. For example, in the record level graph 1200, in approximately 75% of the records 95-100% of the fields were an exact match, while in approximately 20% of the records 90-95% of the fields were an exact match. Alternatively, in approximately 80% of the records 0-5% of the fields were outside of the tolerance, and in approximately 92% of the records 0-5% of the fields were within the tolerance.

Figure 13:
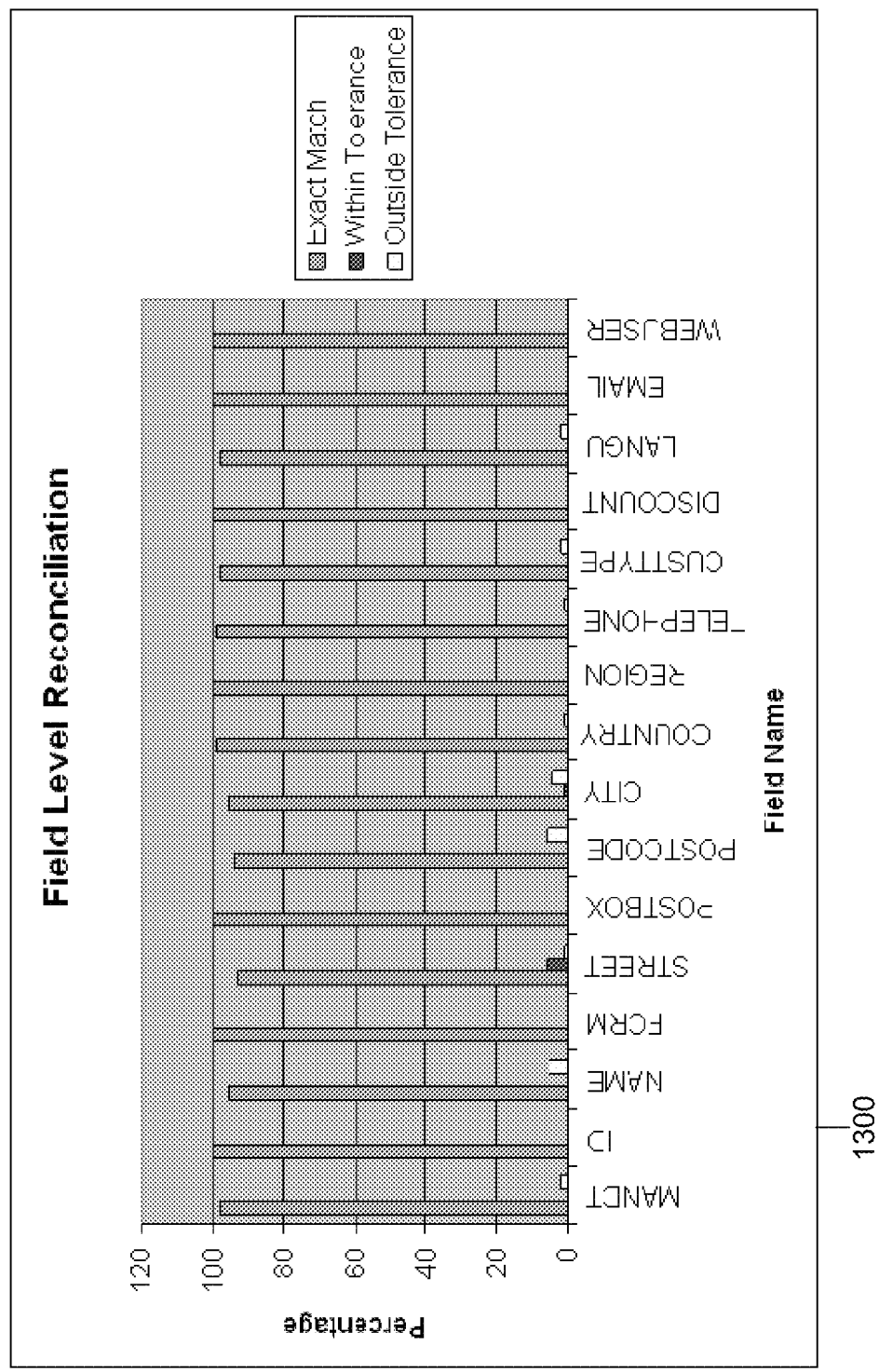
FIG. 13 is a screenshot of a field level graph in the system of FIG. 1, or other data comparison systems.

FIG. 13 is a screenshot of a field level graph 1300 in the system of FIG. 1, or other data comparison systems. The field level graph 1300 displays the percentage of each field which is an exact match, within the tolerance or outside of the tolerance. For example, in the field level graph 1300, approximately 98% of the "MANDT" fields were an exact match, which approximately 100% of the "ID" fields were an exact match.

FIG. 14 illustrates a general computer system 1400, which may represent a service provider server 240, or any of the other computing devices referenced herein. The computer system 1400 may include a set of instructions 1424 that may be executed to cause the computer system 1400 to perform any one or more of the methods or computer based functions disclosed herein. The computer system 1400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1424 (sequential or otherwise) that specify actions to be taken by that machine. In a particular embodiment, the computer system 1400 may be implemented using electronic devices that provide voice, video or data communication. Further, while a single computer system 1400 may be illustrated, the term "system" shall also be taken to include any collection of systems or subsystems that individually or jointly execute a set, or multiple sets, of instructions to perform one or more computer functions.

As illustrated in FIG. 10, the computer system 1400 may include a processor 1402, such as, a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404 that can communicate via a bus 1408. The memory 1404 may be a main memory, a static memory, or a dynamic memory. The memory 1404 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1404 may include a cache or random access memory for the processor 1402. Alternatively or in addition, the memory 1404 may be separate from the processor 1402, such as a cache memory of a processor, the system memory, or other memory. The memory 1404 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1404 may be operable to store instructions 1424 executable by the processor 1402. The functions, acts or tasks illustrated in the figures or described herein may be performed by the programmed processor 1402 executing the instructions 1424 stored in the memory 1404. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 1400 may further include a display 1414, such as a liquid crystal display (LCD), an organic light emitting diode (OLED), a flat panel display, a solid state display, a cathode ray tube (CRT), a projector, a printer or other now known or later developed display device for outputting determined information. The display 1414 may act as an interface for the user to see the functioning of the processor 1402, or specifically as an interface with the software stored in the memory 1404 or in the drive unit 1406.

Additionally, the computer system 1400 may include an input device 1412 configured to allow a user to interact with any of the components of system 1400. The input device 1412 may be a number pad, a keyboard, or a cursor control device, such as a mouse, or a joystick, touch screen display, remote control or any other device operative to interact with the system 1400.

The computer system 1400 may also include a disk or optical drive unit 1406. The disk drive unit 1406 may include a computer-readable medium 1422 in which one or more sets of instructions 1424, e.g. software, can be embedded. Further, the instructions 1424 may perform one or more of the methods or logic as described herein. The instructions 1424 may reside completely, or at least partially, within the memory 1404 and/or within the processor 1402 during execution by the computer system 1400. The memory 1404 and the processor 1402 also may include computer-readable media as discussed above.

The present disclosure contemplates a computer-readable medium 1422 that includes instructions 1424 or receives and executes instructions 1424 responsive to a propagated signal; so that a device connected to a network 235 may communicate voice, video, audio, images or any other data over the network 235. Further, the instructions 1424 may be transmitted or received over the network 235 via a communication interface 1418. The communication interface 1418 may be a part of the processor 1402 or may be a separate component. The communication interface 1418 may be created in software or may be a physical connection in hardware. The communication interface 1418 may be configured to connect with a network 235, external media, the display 1414, or any other components in system 1400, or combinations thereof. The connection with the network 235 may be a physical connection, such as a wired Ethernet connection or may be established wirelessly as discussed below. Likewise, the additional connections with other components of the system 1400 may be physical connections or may be established wirelessly. In the case of a service provider server 240, the service provider server may communicate with users 120A-N through the communication interface 1418.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1422 may be a single medium, or the computer-readable medium 1422 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1422 may include a solid-state memory such as a memory card or other package that houses one or more non-volatile read-only memories. The computer-readable medium 1422 also may be a random access memory or other volatile re-writable memory. Additionally, the computer-readable medium 1422 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for performing a tolerance based comparison between a legacy data store and a new data store, the method comprising:
   receiving, by a processor from a device of a user, a compare data structure comprising a plurality of data item pairs, each data item pair identifying a legacy data item of a legacy dataset and a new data item of a new dataset,
      wherein each data item pair comprises a data type of a table data type, a flat structure data type, a deep structure data type, or a field data type, and
      wherein the table data type, the flat structure data type and the deep structure data type each comprise a plurality of records;
   receiving, by the processor from the device of the user, a plurality of tolerances, each tolerance being associated with one of the data item pairs and indicative of an acceptable difference between the data item pair according to the data type of the data item pair;
   recursively comparing, by the processor, each data item pair of the plurality of data item pairs wherein recursively comparing comprises determining the data type of each data item pair, and:
      when the data item pair is a determined to be the table data type, calling a compare subroutine for each record in each table of the data item pair to form new data item pairs to compare;
      when the data item pair is determined to be the flat structure data type or the deep structure data type, calling the compare subroutine for each record in the flat structure data or the deep structure of the data item pair to form new data item pairs to compare;
      when the data item pair is determined to not be one of the table data type, the flat structure data type, the deep structure data type, or the field data type, writing a log entry indicating that the data item pair is an unknown data type;
   determining, by the processor, that each of one or more of the plurality of data item pairs being compared comprises the field data type;
   identifying a subset of the plurality of data item pairs comprising the one or more of the plurality of data item pairs determined to be of the field data type; and
   for each of the one or more of the plurality of data item pairs determined to be of the subset of the plurality of data item pairs:
      checking, by the processor, each legacy data item in relation to each new data item of each data item pair in accordance with the associated tolerance; and
      assigning, by the processor, a category among a plurality of categories for each data item pair determined to be of the subset based on the difference of each data item pair within the tolerance associated with each data item pair, wherein the plurality of categories comprises
         an exact match category,
         a within tolerance category, and
         an outside of tolerance category;
      transforming, by the processor, a result of the checking and assigning into a report, wherein the report describes
         a percentage of the data item pairs assigned the exact match category,
         a percentage of the data item pairs assigned the within tolerance category, and
         a percentage of the data item pairs assigned the outside of tolerance category; and
      providing, by the processor to the device of the user, the report.

2. The computer-implemented method of claim 1 further comprising:
   transforming, by the processor, the result of the checking into the report, wherein the report describes
      a percentage of the legacy and new data items which were an exact match,
      a percentage of the legacy and new data items which were within the associated tolerance, and
      a percentage of the legacy and new data items which were outside the associated tolerance; and
   providing, by the processor to the device of the user, the report.

3. The computer-implemented method of claim 2 wherein the report comprises a plurality of field-level statistics and a plurality of record level statistics.

4. The computer-implemented method of claim 3 wherein the report groups the plurality of field-level statistics based on a field in the plurality of fields.

5. The computer-implemented method of claim 1 wherein receiving the plurality of tolerances further comprises:
   providing, by the processor to the device of the user, a user interface for identifying the plurality of tolerances and the data item pair associated with each tolerance; and
   receiving, from the device of the user, the plurality of tolerances, each tolerance being associated with one of the data item pairs, wherein each tolerance is associated with a threshold variance value between the legacy data item and the new data item in the associated data pair.

6. The computer-implemented method of claim 1 wherein at least one data item comprises a data type of a character data type and the associated tolerance comprises at least one of a case sensitive tolerance and a space sensitive tolerance.

7. The computer-implemented method of claim 1 wherein at least one data item comprises a data type of a date data type and the associated tolerance comprises a number of days difference tolerance.

8. The computer-implemented method of claim 1 wherein the legacy dataset and the new dataset comprise a plurality of invoices.

9. The computer-implemented method of claim 1 further comprising:
   providing, to the device of the user, a user interface for identifying which of the data item pairs to compare; and
   receiving, by the processor from the device of the user, a selection of data item pairs to compare.

10. The computer-implemented method of claim 9 wherein checking, by the processor, each legacy data item and each new data item of each data item pair in accordance with the associated tolerance if the data type of each data item pair comprises the field data type further comprises
   comparing, by the processor, each legacy data item and each new data item of each data item pair in accordance with the associated tolerance if the data type of each data item pair comprises the field data type and if the data item pair was provided, to the device of the user, a user interface for identifying which of the data item pairs to compare.

11. A computer-implemented method for performing a tolerance based comparison between a legacy data store and a new data store, the method comprising:

receiving, by a processor from a device of a user, a compare data structure,
wherein the compare data structure describes a plurality of mappings between a first plurality of data items of a first dataset and a second plurality of data items of a second dataset, and
wherein the data items comprise at least one of
a table,
a field,
a deep structure, or
a flat structure;

populating, by the processor, the compare data structure with a first plurality of data items from the first dataset and the second plurality of data items from the second dataset;

receiving, by the processor, a plurality of tolerances, each tolerance being associated with one of the mappings between the first plurality of data items and the second plurality of data items, wherein each tolerance is associated with a threshold variance value for each mapping of the plurality of mappings and indicative of an acceptable difference between the data item pair according to the data type of the data item pair;

recursively comparing, by the processor, each data item pair of the plurality of data item pairs wherein recursively comparing comprises determining the data type of each data item pair, and:
when the data item pair is a determined to be the table data type, calling a compare subroutine for each record in each table of the data item pair to form new data item pairs to compare;
when the data item pair is determined to be the flat structure data type or the deep structure data type, calling the compare subroutine for each record in the flat structure data or the deep structure of the data item pair to form new data item pairs to compare;
when the data item pair is determined to not be one of the table data type, the flat structure data type, the deep structure data type, or the field data type, writing a log entry indicating that the data item pair is an unknown data type;

determining, by the processor, that each of one or more of the first plurality of data items and of the second plurality of data items comprises the field data type;

identifying a subset of the first plurality of data items comprising the one or more of the first plurality of data items determined to be of the field data type and identifying a subset of the second plurality of data items comprising the one or more of the second plurality of data items determined to be of the field data type;

for each of the one or more of the first and second plurality of data items determined to be of the subset of the plurality of data item pairs:
checking, by the processor, the data items of the subset of the first plurality of data items in the compare data structure with the data items of the subset of the second plurality of data items in the compare structure in accordance with the plurality of mappings and the plurality of tolerances; and assigning, by the processor, a category among a plurality of categories for each data item pair determined to be of the subset based on the difference of each data item pair within the tolerance associated with each data item pair, wherein the plurality of categories comprises
an exact match category,
a within tolerance category, and
an outside of tolerance category;

transforming, by the processor, a result of the checking and assigning into a report, wherein the report describes
a percentage of the data items of the first and second plurality of data items assigned to the exact match category,
a percentage of the data items of the first and second plurality of data items assigned to the within tolerance category, and
a percentage of the data items of the first and second plurality of data items assigned to the outside of the tolerance category; and providing, by the processor to the device of the user, the report.

12. The computer-implemented method of claim 11 wherein the report comprises a plurality of field-level statistics and a plurality of record level statistics.

13. The computer-implemented method of claim 12 wherein the report groups the plurality of field-level statistics based on a field in the plurality of fields.

14. The computer-implemented method of claim 11 wherein at least one data item comprises a data type of a character data type and the associated tolerance comprises at least one of a case sensitive tolerance and a space sensitive tolerance.

15. The computer-implemented method of claim 11 wherein at least one data item comprises a data type of a date data type and the associated tolerance comprises a number of days difference tolerance.

16. The computer-implemented method of claim 11 wherein the first dataset and the second dataset comprise a plurality of invoices.

17. The computer-implemented method of claim 11 further comprising:
providing, to the device of the user, a user interface for identifying which of the mappings to check; and
receiving, by the processor from the device of the user, a selection of mappings to check.

18. The computer-implemented method of claim 17 wherein checking, by the processor, the first plurality of data items in the compare data structure with the second plurality of data items in the compare structure in accordance with the plurality of mappings and the plurality of tolerances if each mapping was selected by the user.

19. A data comparison system, the system comprising:
a memory to store a compare data structure comprising
a plurality of data item pairs, each data item pair identifying a legacy data item of a legacy dataset and a new data item of a new dataset,
wherein each data item pair comprises a data type of
a field data type,
a table data type,
a flat structure data type, or
a deep structure data type,
and wherein the table data type, the flat structure data type and the deep structure data type each comprise a plurality of records, and a plurality of tolerances, each tolerance being associated with one of the data item pairs and indicative of an acceptable difference between the data item pair according to the data type of the data item pair;

an interface operatively connected to the memory, the interface operative to communicate with a device of a user; and a processor operatively connected to the memory and the interface, the processor operative to receive, from the device of the user via the interface, the compare data structure and the plurality of tolerances, recursively call a compare data subroutine to compare each legacy data item and each new data item identified by each data item pair wherein recursively comparing comprises determining the data type of each data item pair, and:

when the data item pair is a determined to be the table data type, calling a compare subroutine for each record in each table of the data item pair to form new data item pairs to compare;

when the data item pair is determined to be the flat structure data type or the deep structure data type, calling the compare subroutine for each record in the flat structure data or the deep structure of the data item pair to form new data item pairs to compare;

when the data item pair is determined to not be one of the table data type, the flat structure data type, the deep structure data type, or the field data type, writing a log entry indicating that the data item pair is an unknown data type;

determine that each of one or more of the data item pairs being compared comprises the field data type, identify a subset of the data item pairs comprising the one or more of the plurality of data item pairs determined to be of the field data type, and for each of the one or more of the data item pairs determined to be of the subset of the data item pairs:

check each legacy data item and each new data item in accordance with the associated tolerance if the data type of each data item pair in accordance with the associated tolerance; and assign a category among a plurality of categories for each data item pair determined to be of the subset based on the difference of each data item pair within the tolerance associated with each data item pair, wherein the plurality of categories comprises an exact match category,
a within tolerance category, and
an outside of tolerance category.

20. The system of claim 19, wherein the report describes a percentage of a first and second data items which were an exact match,
a percentage of the first and second data items which were within the associated tolerance, and
a percentage of the first and second data items which were outside the associated tolerance, and provide, to the device of the user via the interface, the report.

21. The system of claim 20 wherein the report comprises a plurality of field-level statistics and a plurality of record level statistics.

22. The system of claim 21 wherein the report groups the plurality of field-level statistics based on a field in the plurality of fields.

23. The system of claim 19 wherein the processor is further operative to
provide, to the device of the user via the interface, a user interface for identifying the plurality of tolerances and the data item pair associated with each tolerance, and
receive, from the device of the user via the interface, the plurality of tolerances, each tolerance being associated with one of the data item pairs and is associated with a threshold variance value between the legacy data item and the new data item in the associated data pair.

24. The system of claim 19 wherein the processor is further operative to
compare each legacy data item and each new data item to determine a difference between each legacy data item and each new data item if each legacy data item and each new data item comprise the field, and
assign one of the plurality of categories for each data item pair, the category assigned based on whether the difference of each data item pair is within the associated tolerance.

25. The system of claim 24 wherein each category comprises one of an exact match category, a within tolerance category and an outside of tolerance category.

26. The system of claim 25 wherein the processor is further operative to transform each category into the report, wherein the report describes a percentage of the data item pairs which assigned the exact match category, a percentage of the data item pairs which were assigned the within tolerance category, and a percentage of the data item pairs which were assigned the outside of tolerance category, and provide, to the device of the user via the interface, the report.

27. The system of claim 19 wherein at least one data item comprises a data type of a character data type and the associated tolerance comprises at least one of a case sensitive tolerance and a space sensitive tolerance.

28. The system of claim 19 wherein at least one data item comprises a data type of a date data type and the associated tolerance comprises a number of days difference tolerance.

29. The system of claim 19 wherein the legacy dataset and the new dataset comprise a plurality of invoices.

30. The system of claim 19 wherein the processor is further operative to
provide, to the device of the user via the interface, a user interface for identifying which of the data item pairs to check, and
receive, from the device of the user via the interface, a selection of data item pairs to check.

31. The system of claim 30 wherein the processor is further operative to check each legacy data item and each new data item in accordance with the associated tolerance if each legacy data item and each new data item comprise the field and if the data item pair was selected by the user.

* * * * *